(12) United States Patent
Kwok et al.

(10) Patent No.: US 11,917,457 B2
(45) Date of Patent: *Feb. 27, 2024

(54) NETWORK APPLICATION PROGRAMMING INTERFACE (API) EXPOSURE

(71) Applicant: T-Mobile USA, Inc., Bellevue, WA (US)

(72) Inventors: Ming Shan Kwok, Seattle, WA (US); Wafik Abdel Shahid, Kenmore, WA (US); Boua Thong Lor, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,279

(22) Filed: Aug. 29, 2022

(65) Prior Publication Data

US 2022/0417801 A1  Dec. 29, 2022

Related U.S. Application Data

(63) Continuation of application No. 16/914,016, filed on Jun. 26, 2020, now Pat. No. 11,432,201.

(51) Int. Cl.
*H04W 28/24* (2009.01)
*H04L 47/62* (2022.01)
(Continued)

(52) U.S. Cl.
CPC ......... *H04W 28/24* (2013.01); *H04L 47/6215* (2013.01); *H04W 28/0268* (2013.01);
(Continued)

(58) Field of Classification Search
None
See application file for complete search history.

(56) References Cited

U.S. PATENT DOCUMENTS 11,432,201 B2 *  8/2022  Kwok ................ H04L 47/6215
2012/0101952 A1    4/2012  Raleigh et al.
(Continued)

OTHER PUBLICATIONS

3rd Generation Partnership Project; Technical Specification Group Services and System Aspects; Study on Application architecture for enabling Edge Applications; (Release 17) 3GPP TR 23.758 V17 0.0 (Dec. 2019) (Year 2019).
(Continued)

*Primary Examiner* — Alex Skripnikov
(74) *Attorney, Agent, or Firm* — Lee & Hayes P.C.

(57) ABSTRACT

Providing access to Fifth Generation (5G) wireless communication services via an Application Programming Interface (API) is described. In an example, a request for 5G wireless communication services associated with a 5G wireless communication service provider can be received via the API. The 5G wireless communication service provider can determine that it can accommodate the request and can cause a notification to be presented via the application, wherein the notification includes an indication that the 5G wireless communication services are available. Based at least in part on receiving an indication of an input associated with the notification, the 5G wireless communication services can provide 5G wireless communication services to a user device via the API.

20 Claims, 5 Drawing Sheets

(51) Int. Cl.
  *H04W 28/02*      (2009.01)
  *H04W 28/22*      (2009.01)
  *H04W 68/00*      (2009.01)
  *H04W 72/543*     (2023.01)
(52) U.S. Cl.
  CPC ......... *H04W 28/22* (2013.01); *H04W 68/005* (2013.01); *H04W 72/543* (2023.01)

(56) References Cited

U.S. PATENT DOCUMENTS

| | | |
|---|---|---|
| 2013/0060653 A1 | 3/2013 | Sharkey |
| 2017/0201850 A1 | 7/2017 | Raleigh et al. |
| 2019/0373443 A1 | 12/2019 | Palaniappan et al. |
| 2020/0389531 A1 | 12/2020 | Lee et al. |
| 2021/0410016 A1 | 12/2021 | Kwok et al. |

OTHER PUBLICATIONS

Multi Access Edge Computing (MEC) Edge Platform Application Enablement; ETSI GS MEC 011 V 2.1.12(Nov. 2019) (Year 2019).
Office Action for U.S. Appl. No. 16/914,016, dated Feb. 2, 2022, Kwok, "Network Application Programming Interface (API) Exposure", 6 pages.
Multi Access Edge Computing (MEC); UE application interface; ETSI GS MEC 016 V2.1.1 (Apr. 2019) ( Year 2019).

* cited by examiner

NETWORK APPLICATION PROGRAMMING INTERFACE (API) EXPOSURE

RELATED APPLICATION

This application is a continuation of and claims priority to U.S. patent application Ser. No. 16/914,016, filed Jun. 26, 2020, titled "NETWORK APPLICATION PROGRAMMING INTERFACE (API) EXPOSURE," the entirety of which is incorporated herein by reference.

BACKGROUND

There are different generations of wireless network technology. Fifth Generation (5G) network technology offers greater reliability than existing wireless network technologies, provides enhanced capacity over existing wireless network technologies, and provides faster speeds than existing wireless network technologies. As a result, 5G network technology has the potential to benefit everything from entertainment and gaming to education and public safety. Over time, 5G network technology is expected to deliver faster download speeds, real-time responses, and enhanced connectivity, giving businesses and consumers the potential to experience new, innovative technologies.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
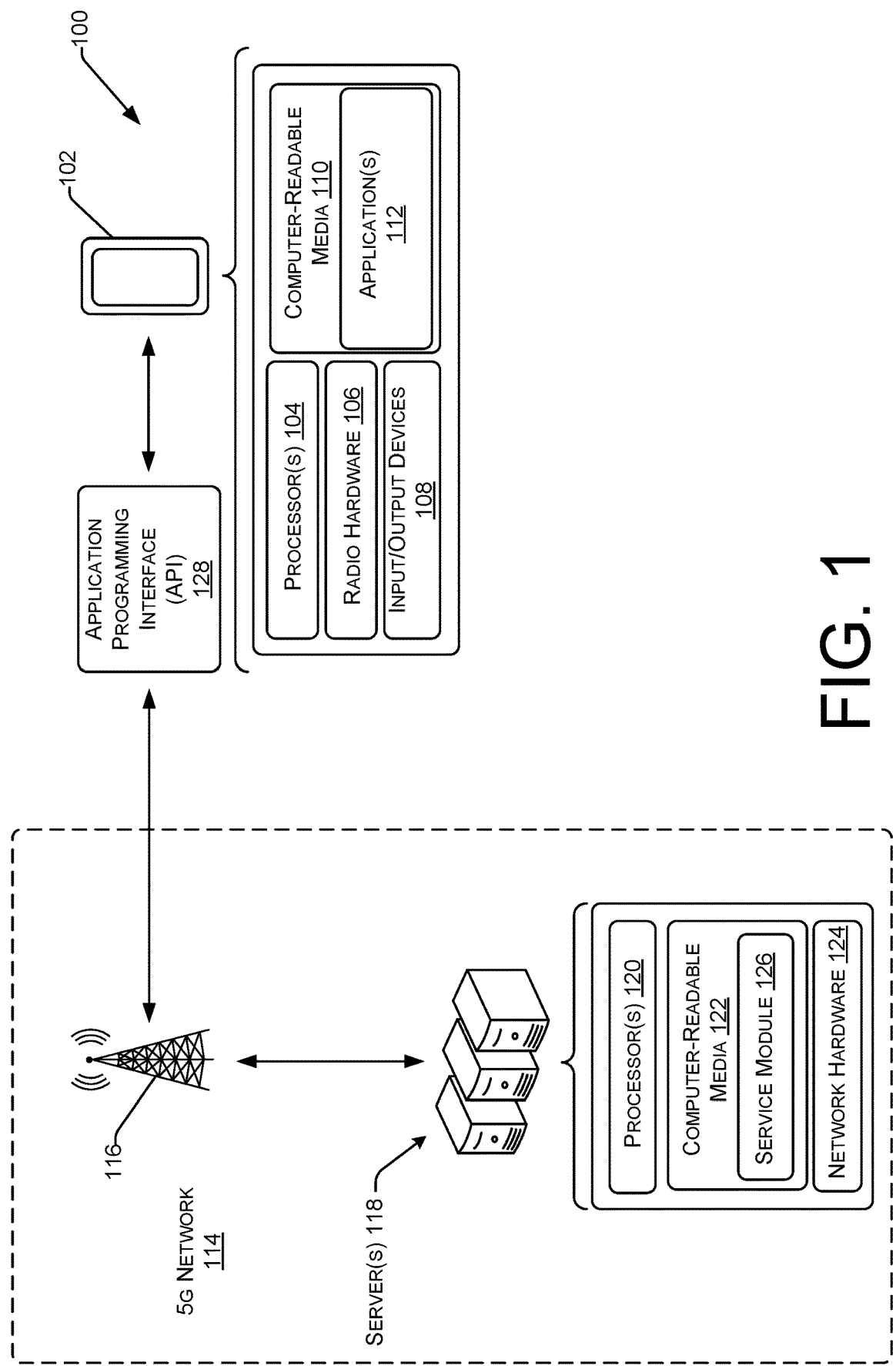
FIG. 1 illustrates an example environment associated with techniques described herein.

Techniques described herein are directed to providing wireless communication services, such as those availed via Fifth Generation (5G) network technology, as a service via an application programming interface (API). That is, techniques described herein are directed to exposing wireless communications services availed via 5G network technology as a service via an API, so that users can receive higher-quality network services for certain use cases and/or user applications. For example, 5G network technology enables mobile edge computing, network slicing, low latency (e.g., ultra-reliable low-latency communication (URLLC)), high accuracy, on demand quality of service (QoS) and/or quality of experience (QoE), in-flow QoS, and the like, and thus, can be used for providing higher-quality network services, for example, for designated durations and at determined costs for use with users in various use cases and/or user applications.

In an example, an application on a user device can avail 5G services for various use cases (e.g., cross reality (XR) experience (e.g., virtual reality (VR), mixed reality (MR), cinematic reality (CR), etc. which may or may not be paired with wearable input/output devices), Internet of Things (IoT), office automation, mobile entertainment, cloud gaming, targeted advertisement, precision control, on-demand real time delivery, etc.), which can be associated with other applications on the user device. Upon receiving a request for 5G wireless communication services, the application can send a request to the wireless communication service provider associated with the 5G wireless communication services via an API. The wireless communication service provider can determine whether to grant the request based on network capacity, occupancy, and/or other information associated with the 5G network. If the wireless communication service provider grants the access, the wireless communication service provider can provide 5G wireless communication services to the user device (e.g., at a guaranteed bit rate) for a designated period of time via the API. In some cases, the user can consent to the enhanced services (e.g., agree to terms associated with the services and/or details associated with the services) and can agree to payment for said services prior to the wireless communication service provider providing the 5G wireless communication services to the user device. As a result, the user can utilize network API exposure to access 5G wireless communication services that provide an improved user experience.

As described above, techniques described herein are directed to exposing 5G wireless communication services as a service via an API, so that users can receive higher-quality network services for certain use cases and/or user applications. Techniques described herein therefore offer an improvement to a technology or technical field, for example, by providing higher-quality network services to users, thereby providing an improved user experience than what is traditionally available via a subscription with a wireless communications service provider. In at least one example, such an improvement can be achieved by allocating resources associated with a 5G network responsive to demand for 5G network resources. That is, techniques described herein can improve the functioning of the 5G network overall by modifying the demand for 5G resources and/or allocating resources associated with the 5G network responsive to such demand, thereby reducing congestion for devices and/or users that seemingly require specific latency, throughput, etc.

Additional details are described below with reference to FIGS. 1-6.

FIG. 1 illustrates an example environment 100 associated with techniques described herein. In an example, the environment 100 can include a user device 102. In at least one example, the user device 102 can be configured with processor(s) 104, radio hardware 106, input/output devices 108, and computer-readable media 110.

In at least one example, the user device 102 can be any suitable type of user device configured to communicate over a wired or wireless service provider, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar user device, as well as situated user devices including, without limitation, a television (smart television), set-top-box (STB), desktop computer, an IoT device, and the like.

The processor(s) 104 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 104 can execute one or more modules and/or processes to cause the user device 102 to perform a variety of functionalities, as set forth above and explained in further detail in the following disclosure. Additionally, each of the processor(s) 104 can possess its own local memory, which also can store program modules, program data, and/or one or more operating systems.

The radio hardware 106 provides the user device 102 with wireless capabilities, such as connecting to one or more base stations associated with one or more service providers, as described above. The radio hardware 106 can include or be incorporated into processors, ASICs, programmable circuits such as FPGAs, or in other ways. In at least one example, the radio hardware 106 can include radios associated with one or more cellular network technologies (e.g., second generation (2G), third generation (3G), fourth generation (4G), fifth generation (5G), etc.). The user device 102 can include additional or alternative hardware to enable the device to access service provider(s) via additional or alternative network(s) (e.g., BLUETOOTH®, WI-FI®, etc.).

The radio hardware 106 can configure the user device 102 for transmitting and/or receiving data wirelessly using any suitable wireless communications and/or data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Service provider (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over internet protocol (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future internet protocol (IP)-based service provider technology or evolution of an existing IP-based service provider technology.

Depending on the exact configuration and type of the user device 102, the computer-readable media 110, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, service provider attached storage, storage area service providers, hosted computer storage or any other storage memory, storage device, and/or storage medium that can be used to store and maintain information for access by a user device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 110 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the user device 102. Any such non-transitory computer-readable media can be part of the user device 102.

In contrast, communication media includes computer readable instructions, data structures, program modules, or other data in a modulated data signal, such as a carrier wave, or other transmission mechanism. As defined herein, computer storage media does not include communication media.

The computer-readable media 110 can include one or more modules and data structures that can be in the form of stand-alone applications, productivity applications, an operating system component, or any other application or software module to configure the user device 102 to perform operations, as described herein. In at least one example, the computer-readable media 110 can include application(s) 112, which can be associated with a wireless communications service provider, third-parties, or the like. In at least one example, the application(s) 112 can include, but are not limited to, an XR application, a gaming application, an IoT application, an office automation application, an entertainment application, an advertising application, a precision control application, a social networking application, or the like. That is, individual of the application(s) 112 can be associated with different "use cases" or "user applications." In at least one example, a first application of the application(s) 112 can be associated with the wireless communication service provider and can access wireless communication services on behalf of a second application of the application(s) 112, which can include any of the user applications described above. In such an example, the first and second applications can transmit data between one another such that the first application can provide wireless communication services to the second application. Additional details are described below.

In at least one example, the user device 102 can subscribe to services associated with a wireless communication service provider (e.g., a telecommunications service provider). In at least one example, the wireless communication service provider can be associated with one or more cellular networks associated with one or more cellular network technologies (e.g., 2G, 3G, 4G, 5G, etc.) or other network technologies. In at least one example, a cellular network can include one or more base stations (also known as cell sites or cell towers), which can be associated with antennae and other electronic communications equipment (e.g., transceivers, digital signal processors, control electronics, a GPS receiver, etc.) to create a cell. The wireless communication service provider can have multiple base stations, creating multiple cells, thereby generating a cellular network.

In at least one example the wireless communication service provider can provide 5G services via a 5G network 114. The 5G network 114 can comprise base stations and other network hardware configured with 5G network technology. A single base station 116 is illustrated, but in practice, the 5G network 114 can have multiple (e.g., tens, hundreds, thousands, etc.) of base stations. In some examples, each cell can be associated with a physical cell ID (PCI) to identify the cell in the network. That is, a cell associated with the base station 116 can be associated with a PCI to identify the cell in the 5G network 114.

In at least one example, in addition to the base stations and other network hardware, the 5G network 114 can include one or more computing devices, such as server(s) 118, that are associated with a core network of the 5G network 114. In at least one example, a core network is a core part of a wireless communication service provider's network, which offers numerous services to users (e.g., subscribers, customers, etc.) who are interconnected by the access network and their respective devices. In at least one example, the core network can direct telephone calls, messages, and data transmission to and/or between user devices associated with the 5G network. In some examples, the core network can provide additional or alternative services, which can include IP multimedia subsystem (IMS) services (e.g., voice over IP (VoIP), push-to-talk (PTT), push-to-view, video calling, video sharing, etc.).

In at least one example, the server(s) 118 can be any type of server, such as a network-accessible server. In some examples, the server(s) 118 can be stand-alone computing systems, distributed-computing systems, networked-computing systems, etc. For instance, in at least one example, one or more of the functionalities described herein as being performed by the server(s) 118 can be performed by a single device or multiple devices. In some examples, one or more of the functionalities described herein can be performed by the user device 102 instead of, or in addition to, the server(s) 118. Similarly, in some examples, one or more of the functionalities described herein as being performed by the user device 102 can be performed by the server(s) 118 instead of, or in addition to, the user device 102.

In various examples, each of the server(s) 118 can be associated with one or more processors 120, computer-readable media 122, and network hardware 124. The processor(s) 120 can have the same and/or similar structure and/or function as the processor(s) 104, described above. The computer-readable media 122 can have the same or similar structure and/or function as the computer-readable media 110 described above. The network hardware 124 can provide wired or wireless networking capabilities to the server(s) 118. The network hardware 124 can include or be incorporated into processors, ASICs, programmable circuits such as FPGAs, or in other ways.

In at least one example, the computer-readable media 122 can include one or more modules and data structures that can be in the form of stand-alone applications, productivity applications, an operating system component, or any other application or software module to configure the server(s) 118 to perform operations, as described herein. In at least one example, the computer-readable media 122 can be associated with a service module 126 which can receive request(s) for wireless communication services (e.g., 5G wireless communication services availed via the 5G network 114), determine whether such request(s) can be accommodated, and/or provide wireless communication services to requesting user devices, as described herein. In some examples, the service module 126 can receive a request via an API 128 to access wireless communication services associated with the 5G network 114. In some examples, the request can be associated with a PCI indicating a cell of the 5G network 114 within which the user device 102 is operating. In at least one example, the request can include one or more parameters, which can include a latency parameter, a throughput parameter, a quality of service parameter, or the like. In some examples, the parameter(s) can be designated by the user of the user device 102. In some examples, the parameter(s) can be designated based at least in part on which application and/or type of application is requesting the services. In some examples, the parameter(s) can be designated by the wireless communications service provider.

Figures 2, 3:
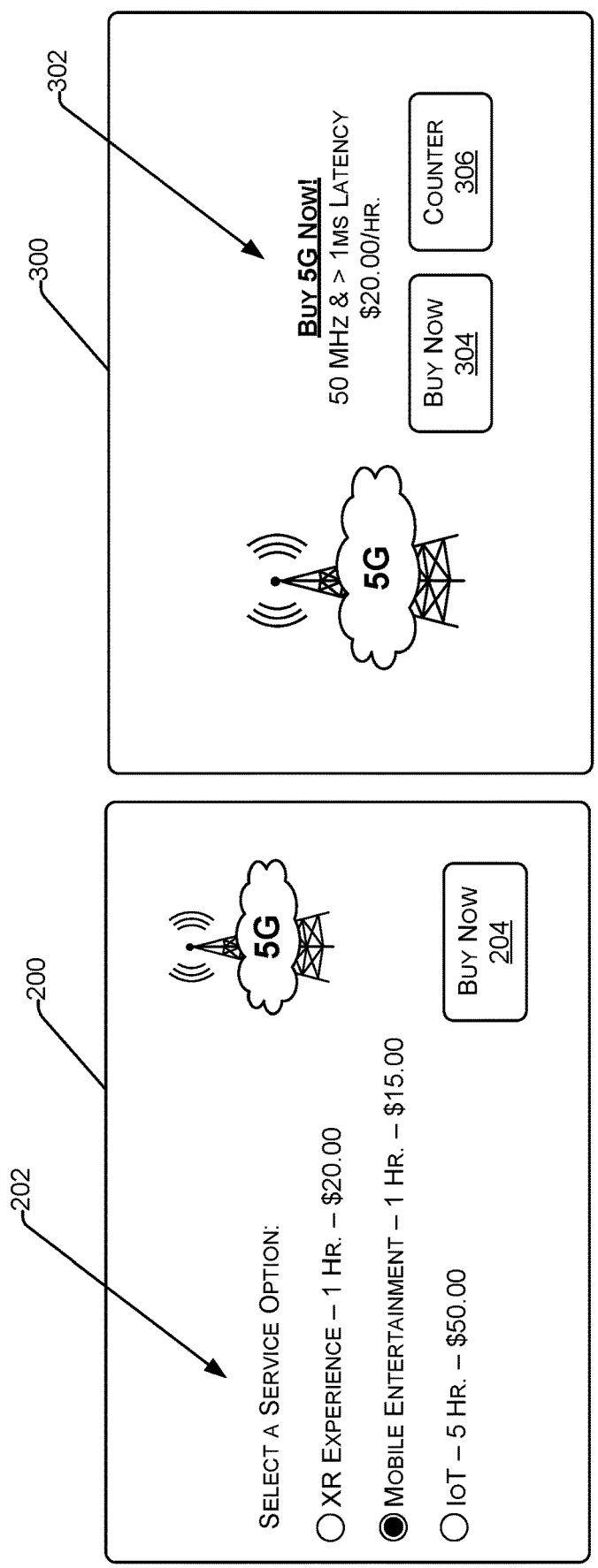
FIG. 2 illustrates an example graphical user interface for presenting service options available from a wireless communication service provider, as described herein.
FIG. 3 illustrates an example graphical user interface for presenting service options available from a wireless communication service provider, as described herein.

In at least one example, the parameter(s) can be associated with individual service options, which can correspond to different use cases and/or applications of use, that are offered by the wireless communications service provider. In such examples, individual service options can be presented via a graphical user interface, as illustrated in FIG. 2. In such examples, the parameter(s) associated with individual service options can be designated by the wireless communications service provider.

In at least one example, the service module 126 can determine information associated with the 5G network 114 to determine whether the request can be accommodated. That is, in such an example, the service module 126 can determine whether the 5G network 114 can deliver a quality of service that satisfies the quality of service parameter, a latency that satisfies the latency parameter, a throughput that satisfies the throughput parameter, and/or the like. In some examples, the service module 126 can use the PCI associated with the request to determine information associated with the 5G network 114 and the cell within which the user device 102 is operating to determine whether the request and/or parameter(s) associated with the request can be accommodated. For example, the service module 126 can determine radio resource availability to determine whether the 5G network 114 can deliver a quality of service that satisfies the quality of service parameter, a latency that satisfies the latency parameter, a throughput that satisfies the throughput parameter, and/or the like. For example, the service module can utilize a 5G network slicing framework to attempt to dedicate specific resources for a certain slice with a committed quality of service agreement. The dedicated radio resources can enable a certain service request to be fulfilled. In some examples, the detail implementation can be static radio resource allocation, dynamic radio resource allocation with pre-emptive mechanism for prioritized services, etc. In addition, radio resource ability can be manipulated or modified through dynamic cell configuration (e.g., by changing Sub-carrier Spacing (SCS) and/or uplink (UL)/downlink (DL) slot allocation for a cell dynamically). Such cell configuration changes can double, quadruple, or otherwise multiply the available radio resources within a given timeframe.

In at least one example, the service module 126 can send a notification to the user device 102 via the API 128 indicating whether the request can be accommodated (e.g., whether wireless communication services can be provided) and, in some examples, details associated with such service (e.g., quality of service available, latency, throughput, etc.).

In some examples, the service module 126 can determine a duration of time for which wireless communication services can be provided, a bit rate at which such wireless communications can be provided (guaranteed), a cost associated with providing such wireless communication services (e.g., for the duration of time at the guaranteed bit rate), etc. In some examples, the duration, bit rate, and/or cost can be determined based at least in part on the information associated with the 5G network 114 determined responsive to receiving the request. In such examples, the notification can include an indication of the duration, bit rate, cost, or the like. A non-limiting example of a graphical user interface presenting such a notification is illustrated in FIG. 3. In some examples, the notification can include a mechanism that enables the user to accept the duration, bit rate, cost, etc., and, responsive to determining that the user accepts the duration, bit rate, cost, etc., the service module 126 can provide the wireless communication services to the user device 102 via the API 128, for the duration, at the guaranteed bit rate, and for the cost as accepted. In other examples, the notification can include a mechanism through which a user can send a request to modify the duration, bit rate, cost, etc. In such an example, the user of the user device 102 can interact with a user interface presented via one of the application(s) 112 to negotiate the terms of the wireless communication services.

As described above, in at least one example, based at least in part on receiving an input indicating that the user of the user device 102 desires to access the wireless communication services and agrees to the terms associated therewith, the service module 126 can provide the wireless communication services to the user device 102 via the API 128, for the duration, at the guaranteed bit rate, and for the cost as accepted. That is, in at least one example, the service module 126 can reserve the bit rate and/or latency for the duration of the service.

The API 128 can comprise a computing interface that defines interactions between multiple entities, such as the user device 102 and the server(s) 118. For example, the API 128 can define types of calls or requests that can be made, how to make such calls or requests, data formats associated with such calls or requests, conventions to be used, and the like. In at least one example, the API 128 can be provided by the wireless communications service provider. The API 128 therefore can enable the user device 102 to request and/or access wireless communication services available via the 5G network via the API 128. That is, in at least one example, data exchanged between the user device 102 and the server(s) 118 can be transmitted via the API 128. In some examples, the API 128 can be integrated in the user device 102 and/or individual of the application(s) 112 on the user device 102. In other examples, the API 128 can be associated with an intermediary computing device in communication with the user device 102 and the server(s) 118. In some examples, the API 128 can be integrated into the server(s) 118.

In some examples, the server(s) 118 can include a network module 130, which can be associated with the computer-readable media 122 and/or the network hardware 124. In at least one example, the network module 130 can comprise one or more modules or data structures that can be in the form of stand-alone application(s), productivity application(s), an operating system component, or any other application or software module to configure the network hardware 124 or other components of the server(s) 118 to perform operations, as described herein. In some examples, the network module 130 can be specialized for the network hardware 124 and can expose control of the network parameters for the API 128. That is, the network module 130 can interface with and control network parameters associated with the 5G network 114. Such network parameters can include, but are not limited to, a radio network resource scheduler, cell configuration parameters, end-to-end (E2E) network bandwidth allocation, guaranteed edge server capacity at the edge computing platform, etc. In some examples, both the network hardware 124 and the network module 130 can be owned, controlled, or otherwise managed by a network vendor associated with the 5G network 114. In some examples, the network vendor or the service provider associated with the 5G network 114 can develop the service module 126 to communicate with the network module 130 to expose corresponding network functions for real-time control by the API 128.

FIGS. 2 and 3 are non-limiting examples of graphical user interfaces that can be presented via the user device 102. Additional configurations and/or content are within the scope of this disclosure. That is, graphical user interfaces presented via the application(s) 112 can include additional or alternative content and/or can be configured in additional or alternative configurations. In some examples, such content can be output via additional or alternative user interfaces (e.g., speakers, etc.).

FIG. 2 illustrates an example graphical user interface 200 for presenting service options available from a wireless communication service provider, as described herein. In at least one example, an application of the application(s) 112 can present the graphical user interface 200, for example, via a display of the user device 102. In at least one example, the application can be associated with the wireless communication service provider and can receive instructions associated with presenting the graphical user interface 200 from the service module 126.

In at least one example, the graphical user interface 200 can include user interface elements 202 associated with one or more service options. In at least one example, the user interface elements 202 can include text, graphics, symbols, objects, or the like. In some examples, the user interface elements 202 can be selectable and/or can otherwise be actuated to indicate a selection or input of the user. In some examples, the user can interact with the user interface elements 202 via touch input, mouse input, spoken input, or the like.

In at least one example, the user interface elements 202 can represent different service options for different use cases or user applications. For example, as illustrated, a first service option can be associated with requesting wireless communication services for an XR experience (e.g., an XR application), a second service option can be associated with mobile entertainment (e.g., a mobile entertainment application), a third service option associated with IoT (e.g., an IoT application), etc. In at least one example, each service option can be associated with a quality of service that can be predetermined by the wireless communications service provider and/or other parameters that can be designated by the wireless communications service provider. In at least one example, each service option can indicate a duration for which the wireless communication services can be accessed and a cost associated with accessing the wireless communication services for the duration.

In some examples, the user can select a service option, for example by interacting with a user interface element corresponding to the service option. In at least one example, the graphical user interface 200 can include a control 204 the actuation of which can cause an indication of input associated with the graphical user interface 200 to be sent to the wireless communication service provider, for example, via the API 128. That is, based at least in part on the user selecting a service option and actuating the control 204, the application can send an indication of the selection to the service module 126 via the API 128. In such an example, the selection can be associated with a request and the service module 126 can determine whether the wireless communications service provider can accommodate the request. If the wireless communications service provider can accommodate the request (e.g., provide wireless communication services to satisfy the associated quality or service or other parameter(s)), the service module 126 can charge the cost associated with the service option to an account of the user, or otherwise collect payment, and can provide wireless communication services for the duration, and at a guaranteed bit rate associated with the predesignated quality of service. In the case of 5G wireless communication services, the user can receive the benefits of 5G network technology (e.g., mobile edge computing, network slicing, low latency, high accuracy, and the like) for the duration such to receive an improved and substantially guaranteed experience.

FIG. 3 illustrates an example graphical user interface 300 for presenting service options available from a wireless communication service provider, as described herein. In some examples, an application of the application(s) 112 can present the graphical user interface 300, which can include an offer for wireless communication services. In some examples, the graphical user interface 300 can be presented responsive to a request for wireless communication services. In some examples, the graphical user interface 300 can include user interface elements 302 representing details associated with the offer. Such user interface elements 302 can include text, graphics, symbols, objects, or the like. In some examples, the user interface elements 202 can be selectable and/or can otherwise be actuated to indicate a selection or input of the user. In some examples, the user can interact with the user interface elements 202 via touch input, mouse input, spoken input, or the like.

In at least one example, the graphical user interface 300 can include a control 304 the actuation of which can cause an indication of input associated with the graphical user interface 300 to be sent to the wireless communication service provider, for example, via the API 128. That is, based at least in part on the user actuating the control 304, the application can send an indication of the input to the service module 126 via the API 128. In such an example, if the user accepts the offer presented via the graphical user interface 300, the service module 126 can charge the cost associated with the offer to an account of the user, or otherwise collect payment, and can provide wireless communication services for the duration, and at a guaranteed bit rate associated with the offer. In the case of 5G wireless communication services, the user can receive the benefits of 5G network technology (e.g., mobile edge computing, network slicing, low latency, high accuracy, and the like) for the duration such to receive an improved and substantially guaranteed experience.

In some examples, the graphical user interface 300 can include a control 306 which can enable the user to decline the offer and counter another offer, for example, with different parameters and/or a different cost. In such example, the user can actuate the control 306, thereby causing the application to send an indication of the input to the service module 126. The service module 126 can determine whether the counteroffer can be accommodated and either (i) accept the counteroffer or (ii) send another offer (i.e., a counteroffer to the counteroffer) to the user device 102 via the API. In some examples, the service module 126 can utilize a data model (e.g., trained by a machine learning mechanism or the like) to determine the other offer or the service module 126 can surface or otherwise present the counteroffer to an agent of the wireless communication service provider (e.g., an employee, etc.) to review the counteroffer and determine the other offer.

Figure 4:
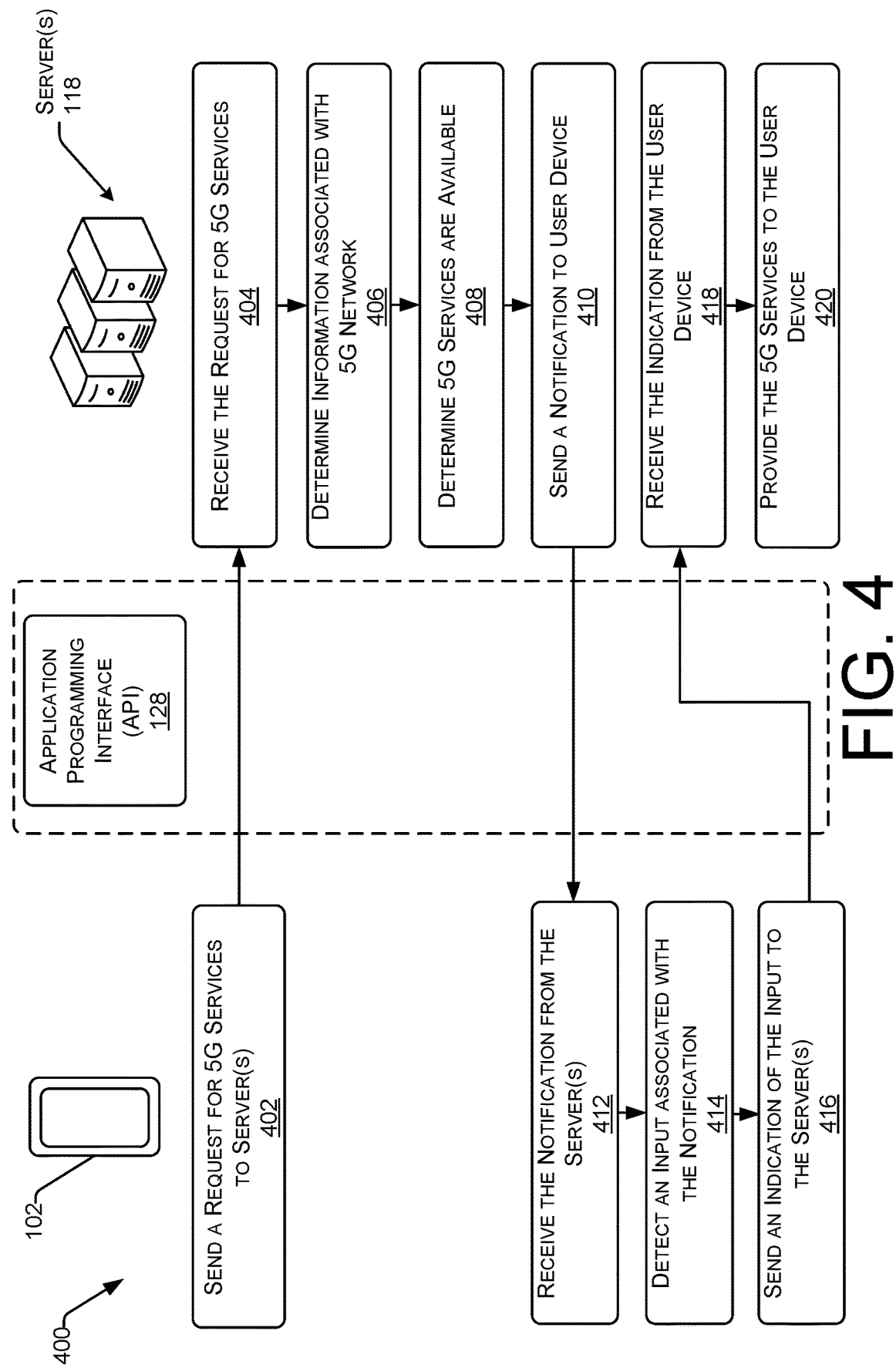
FIG. 4 illustrates an example process for providing wireless communication services via an application programming interface (API), as described herein.
Figure 5:
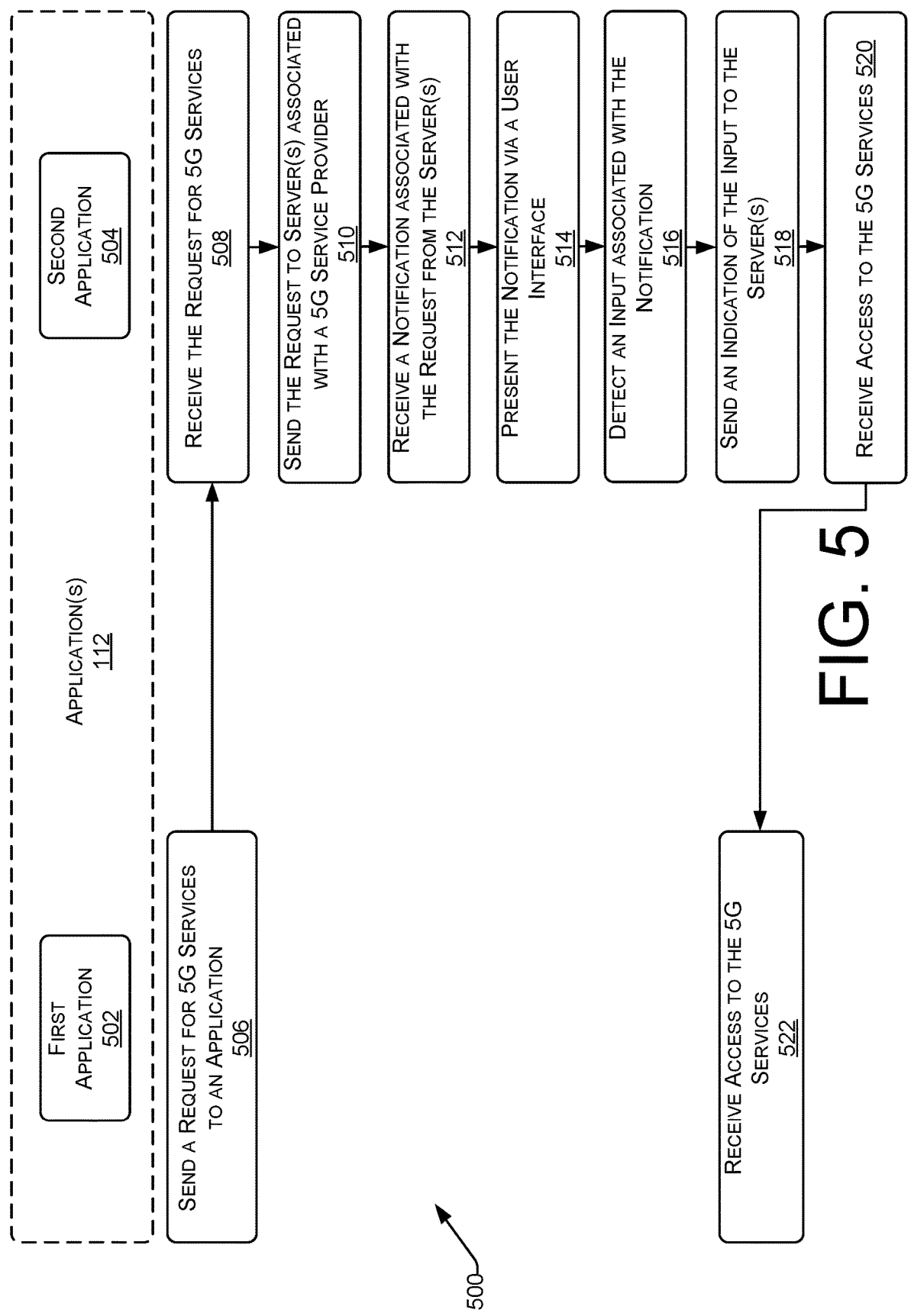
FIG. 5 illustrates an example process for accessing wireless communication services via an API, as described herein.
Figure 6:
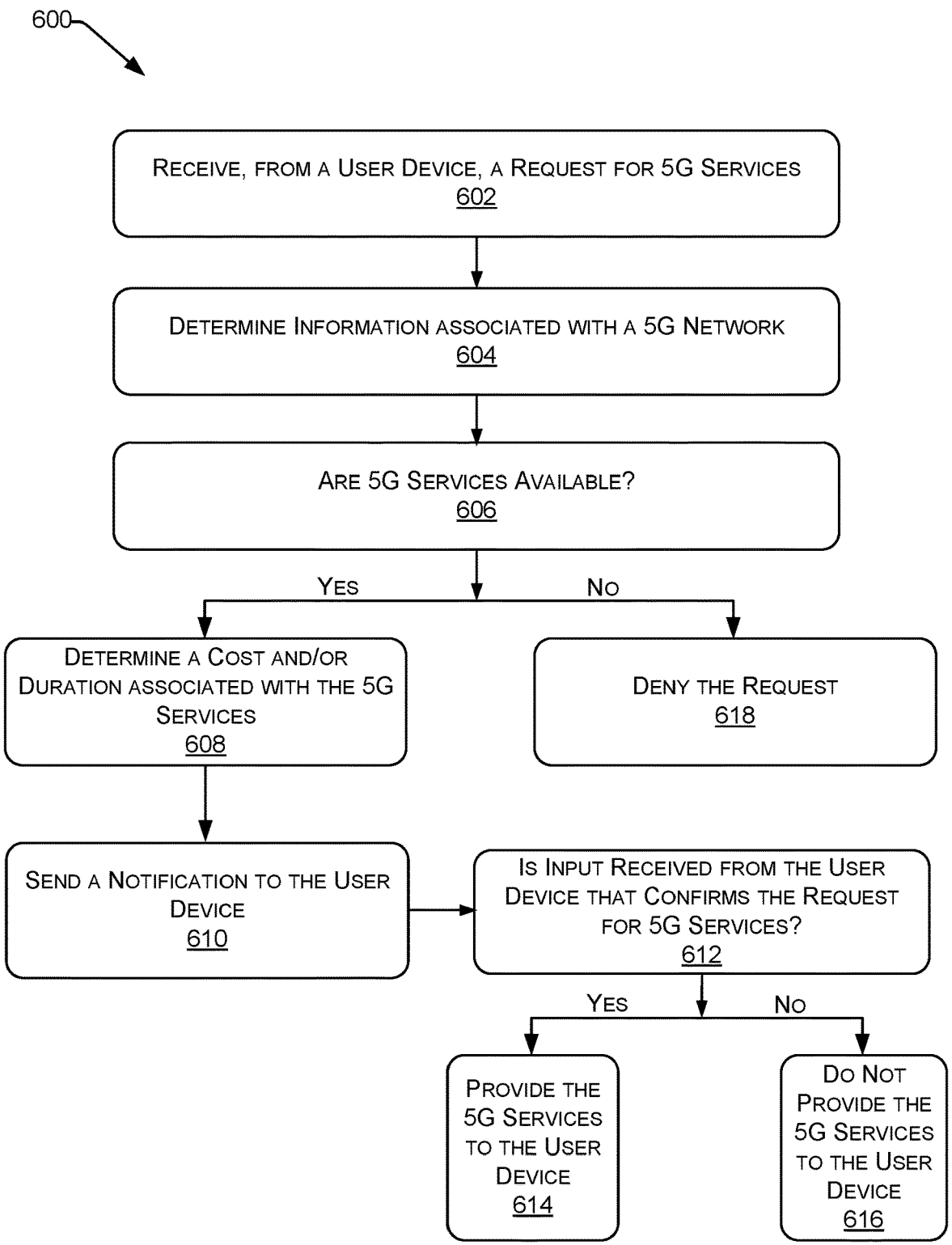
FIG. 6 illustrates an example process for determining whether to provide wireless communication services and/or providing wireless communication services via an API, as described herein.

FIGS. 4-6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIGS. 4-6 are described with reference to components of the example environment described above with reference to FIG. 1. However, FIGS. 4-6 are not limited to such an environment and the components described above with reference to FIG. 1 are not limited to performing the operations described below with reference to FIGS. 4-6.

FIG. 4 illustrates an example process 400 for providing wireless communication services via an application programming interface (API), as described herein. FIG. 4 illustrates the user device 102 and the server(s) 118. Operations shown below the user device 102 can be performed by an application of the application(s) 112. Operations shown below the server(s) 118 can be performed by the service module 126. In at least one example, data exchanged between the user device 102 and the server(s) 118 can be transmitted via the API 128, as described above. In some examples, the API 128 can be integrated in the user device 102 and/or individual of the application(s) 112. In other examples, the API 128 can be associated with an intermediary computing device in communication with the user device 102 and the server(s) 118. In some examples, the API 128 can be integrated into the server(s) 118.

At operation 402, the user device 102 can send a request for 5G services to the server(s) 118. In at least one example, a user can interact with the user device 102, for example via a graphical user interface prevented via an application of the application(s) 112, to request access to wireless communication services, such as 5G services associated with the 5G network 114. In at least one example, the request can be received via an application of the application(s) 112 associated with the user device 102. In some examples, the application can be associated with the wireless communication service provider. In other examples, the application may be associated with a third-party and functionality associated with the wireless communication service provider can be integrated into the application (e.g., via the API 128). In some examples, the request can be associated with a selection of a service option presented via a graphical user interface, such as the graphical user interface 200 described above with reference to FIG. 2.

In some examples, the request can be associated with a PCI indicating a cell of the 5G network 114 within which the user device 102 is operating. In at least one example, the request can include one or more parameters, which can include a latency parameter, a throughput parameter, a quality of service parameter, or the like. In some examples, the parameter(s) can be designated by the user of the user device 102. In some examples, the parameter(s) can be designated based at least in part on which application and/or type of application is requesting the services. In some examples, the parameter(s) can be designated by the wireless communications service provider. As described above, in some examples, the parameter(s) can be associated with individual service options, which can be designated by the wireless communications service provider.

In at least one example, the request can be sent from the user device 102 to the server(s) 118 via the API 128.

At operation 404, the service module 126 can receive a request to access wireless communication services associated with the 5G network 114 via the API 128. In at least one example, based at least in part on receiving the request, the service module 126 can use the PCI associated with the request to determine information associated with the 5G network 114, as illustrated at operation 406, and the cell within which the user device 102 is operating. For example, the service module 126 can determine an occupancy associated with the cell within which the user device 102 is operating, a congestion associated with the cell within which the user device 102 is operating, available bandwidth associated with the cell within which the user device 102 is operating, latency associated with the cell within which the user device 102 is operating, and the like. In some examples, the service module 126 can determine on-going dedicated allocated resources or guaranteed bit rate real-time services for certain applications (e.g., real-time voice calling services, real-time video calling services, etc.).

At operation 408, the service module 126 can determine whether 5G services are available. That is, in at least one example, the service module 126 can use the information associated with the 5G network 114 to determine whether the request can be accommodated. In such an example, the service module 126 can determine whether the 5G network 114 can deliver a quality of service that satisfies the quality of service parameter, a latency that satisfies the latency parameter, a throughput that satisfies the throughput parameter, and/or the like. As described above, in an example, the service module 126 can determine radio resource availability to determine whether the 5G network 114 can deliver a quality of service that satisfies the quality of service parameter, a latency that satisfies the latency parameter, a throughput that satisfies the throughput parameter, and/or the like. For example, the service module can utilize a 5G network slicing framework to attempt to dedicate specific resources for a certain slice with a committed quality of service agreement. The dedicated radio resources can enable a certain service request to be fulfilled. In some examples, the detail implementation can be static radio resource allocation, dynamic radio resource allocation with pre-emptive mechanism for prioritized services, etc. In addition, radio resource ability can be manipulated or modified through dynamic cell configuration (e.g., by changing Sub-carrier Spacing (SCS) and/or uplink (UL)/downlink (DL) slot allocation for a cell dynamically). Such cell configuration changes can double, quadruple or multiply the available radio resources within a given timeframe.

If the request can be accommodated and the wireless communication service provider can provide the user device 102 access to the 5G services, the service module 126 can send a notification to the user device 102 (e.g., via the API 128), as illustrated at operation 410. That is, in at least one example, the service module 126 can send a notification to the user device 102 via the API 128 indicating whether the request can be accommodated (e.g., whether 5G services can be provided) and, in some examples, details associated with such service (e.g., quality of service available, latency, throughput, etc.).

At operation 412, the user device 102 can receive the notification from the server(s) 118, via the API 128, and can cause the notification to be output via the user device 102. In some examples, the notification can be output via a graphical user interface, as illustrated with reference to FIG. 3 above. In other examples, a notification can be output via another mechanism (e.g., speakers, or the like). In at least one example, the user can provide an input, for example, by interacting with a user interface to indicate that the user desires to access the 5G services. In some examples, such an interaction can be an acceptance of an offer that includes details associated with the 5G service. In some examples, such an interaction can be an acceptance to terms of service or another confirmation that the user desires to access the 5G services. In at least one example, the application can detect an input associated with the notification, as illustrated at operation 414 (e.g., detect actuation of a control or other mechanism indicating acceptance of an offer or to terms of service). In at least one example, based at least in part on detecting the input, the application can send an indication of the input to the server(s) 118, as illustrated at operation 416.

At operation 418, the service module 126 can receive the indication from the user device 102 via the API 128 and, so long as the indication indicates that the user accepts the offer, terms of service, etc., the service module 126 can provide the 5G services to the user device 102 via the API 128, as illustrated at operation 420. That is, in at least one example, the service module 126 can enable the user device 102 to access the 5G services for a duration of time, which can be provided at a guaranteed bit rate for the duration of time. In some examples, the guaranteed bit rate can be determined at the time of the request based at least in part on information associated with the 5G network 114 at that time. In examples where such access is associated with a cost, the service module 126 can charge an account of the user or otherwise obtain payment for such access from the user. In at least one example, to provide the 5G services to the user device 102, the service module 126, via the network module 130, can expose a radio network resource scheduler for API control by the API 128, expose cell configuration parameters for API control by the API 128, expose E2E bandwidth allocation (e.g., gateway resources, backbone network resources, backhaul bandwidth resources and RAN resources, etc.), expose guaranteed edge server capacity at the edge computing platform for API control by the API 128, and/or the like. That is, the service module 126, via the network module 130, can interface and expose the control of the network parameters for the API 128.

FIG. 5 illustrates an example process 500 for accessing wireless communication services via an API, as described herein. As described above, in at least one example, the user device 102 can be associated with one or more applications 112. In at least one example, a first application 502 of the application(s) 112, which can include any of the user applications described above, can exchange data with a second application 504 of the application(s) 112, which can be associated with the wireless communication service provider, for accessing wireless communication services. In such an example, the first application 502 may not be able to communicate directly with the server(s) 118 and/or the API 128 and thus may utilize the second application 504 to do so.

At operation 506, the first application 502 can send a request for 5G services to the second application 504. In at least one example, a user can interact with the user device 102, for example via a graphical user interface, to request access to wireless communication services, such as 5G services associated with the 5G network 114. In at least one example, the request can be received via the first application 502. In some examples, the first application 502 can be associated with the wireless communication service provider. In other examples, the first application 502 may be associated with a third-party. In examples where the first application 502 is associated with a third-party, the first application 502 can be configured to exchange data with the second application 504 (e.g., via another API, etc.) to request and receive access to 5G services as described herein.

At operation 508, the second application 504 can receive the request. Based at least in part on receiving the request, the second application 504 can send the request to the server(s) 118 associated with the 5G service provider (e.g., a wireless communication service provider associated with 5G services), as illustrated at operation 510. In some examples, the request can be associated with a PCI indicating a cell of the 5G network 114 within which the user device 102 is operating. In at least one example, the request can include one or more parameters, which can include a latency parameter, a throughput parameter, a quality of service parameter, or the like. In some examples, the parameter(s) can be designated by the user of the user device 102. In some examples, the parameter(s) can be designated based at least in part on which application and/or type of application is requesting the services. In some examples, the parameter(s) can be designated by the wireless communications service provider. As described above, in some examples, the parameter(s) can be associated with individual service options, which can be designated by the wireless communications service provider.

At operation 512, a notification associated with the request can be received from the server(s) 118. In at least one example, if the request can be accommodated and the wireless communication service provider can provide the user device 102 access to the 5G services, the service module 126 can send a notification to the user device 102 (e.g., via the API 128). That is, in at least one example, the service module 126 can send a notification to the user device 102 via the API 128 indicating whether the request can be accommodated (e.g., whether 5G services can be provided) and, in some examples, details associated with such service (e.g., quality of service available, latency, throughput, etc.).

In at least one example, the second application 504 can receive the notification from the server(s) 118, via the API 128, and can cause the notification to be output via a user interface of the user device 102, as illustrated at operation 514. In some examples, the notification can be output via a graphical user interface, as illustrated with reference to FIG. 3 above. In other examples, a notification can be output via another mechanism (e.g., speakers, or the like). In at least one example, the user can provide an input, for example, by interacting with a user interface to indicate that the user desires to access the 5G services. In some examples, such an interaction can be an acceptance of an offer that includes details associated with the 5G services. In some examples, such an interaction can be an acceptance to terms of service or another confirmation that the user desires to access the 5G services. In at least one example, the second application 504 can detect an input associated with the notification, as illustrated at operation 516 (e.g., detect actuation of a control or other mechanism indicating acceptance of an offer or to terms of service). In at least one example, based at least in part on detecting the input, the second application 504 can send an indication of the input to the server(s) 118, as illustrated at operation 518.

At operation 520, the second application 504 can receive access to the 5G services. As described above, the service module 126 can receive the indication from the user device 102 via the API 128 and, so long as the indication indicates that the user accepts the offer, terms of service, etc., the service module 126 can provide the 5G services to the user device 102 via the API 128. The second application 504 can initiate access and can provide the access to the first application 502, as illustrated at operation 522. That is, the first application 502 can access the 5G services via the second application 504 and the API 128.

While FIG. 5 illustrates the use of the second application 504 to provide 5G services to the first application 502, in additional or alternative examples, the API 128 can be integrated into the first application 502 thereby giving the first application 502 the ability to communicate with the server(s) 118 and access the 5G services without going through the second application 504.

FIG. 6 illustrates an example process 600 for determining whether to provide wireless communication services and/or providing wireless communication services via an API, as described herein.

At operation 602, the service module 126 can receive, from a user device 102, a request for 5G services. In at least one example, the service module 126 can receive a request via the API 128 (e.g., from the user device 102, as described above with reference to FIGS. 4 and 5) to access wireless communication services associated with the 5G network 114. In some examples, the request can be associated with a PCI indicating a cell of the 5G network 114 within which the user device 102 is operating. In at least one example, the request can include one or more parameters, which can include a latency parameter, a throughput parameter, a quality of service parameter, or the like. In some examples, the parameter(s) can be designated by the user of the user device 102. In some examples, the parameter(s) can be designated based at least in part on which application and/or type of application is requesting the services. In some examples, the parameter(s) can be designated by the wireless communications service provider. As described above, in some examples, the parameter(s) can be associated with individual service options, which can be designated by the wireless communications service provider.

At operation 604, the service module 126 can determine information associated with a 5G network. In at least one example, based at least in part on receiving the request, the service module 126 can use a PCI associated with the request to determine information associated with the 5G network 114 and the cell within which the user device 102 is operating. For example, the service module 126 can determine an occupancy associated with the cell within which the user device 102 is operating, a congestion associated with the cell within which the user device 102 is operating, available bandwidth associated with the cell within which the user device 102 is operating, latency associated with the cell within which the user device 102 is operating, and the like. In some examples, the service module 126 can determine on-going dedicated allocated resources or guaranteed bit rate real-time services for certain applications (e.g., real-time voice calling services, real-time video calling services, etc.).

At operation 606, the service module 126 can determine whether 5G services are available. In at least one example, the service module 126 can use the information associated with the 5G network 114 to determine whether the request can be accommodated (and thus that 5G services are available). That is, in such an example, the service module 126 can determine whether the 5G network 114 can deliver a quality of service that satisfies the quality of service parameter, a latency that satisfies the latency parameter, a throughput that satisfies the throughput parameter, and/or the like. If the request can be accommodated and the wireless communication service provider can provide the user device 102 access to the 5G services (e.g., "yes" at operation 606), in some examples, the service module 126 can determine a cost and/or a duration (e.g., of time) associated with the 5G services, as illustrated at operation 608. In some examples, the service module 126 can analyze the information associated with the network to determine a duration of time for which wireless communication services can be provided, a bit rate at which such wireless communications can be provided (guaranteed), a cost associated with providing such wireless communication services (e.g., for the duration of time at the guaranteed bit rate), etc.

At operation 610, the service module 126 can send a notification to the user device 102. In at least one example, the service module 126 can send a notification to the user device 102 via the API 128 indicating whether the request can be accommodated (e.g., whether 5G services can be provided) and, in some examples, details associated with such service (e.g., quality of service available, latency, throughput, etc.). In at least one example, the notification can include an indication of the duration, bit rate, cost, or the like.

At operation 612, the service module 126 can determine whether an input that confirms the request for 5G services is received. As described above, in at least one example, based at least in part on sending the notification to the user device 102 and detecting an input associated with the notification, the user device 102 can send an indication of the input to the server(s) 118. The service module 126 can analyze the input to determine whether an input associated with the notification is received and indicates a confirmation that the user desires access to the 5G services. In some examples, such an indication can be a confirmation of terms of service associated with accessing the 5G services, an acceptance of an offer, or the like.

At operation 614, the service module 126 can provide the 5G services to the user device 102. In at least one example, the service module 126 can receive the indication from the user device 102 via the API 128 and, so long as the indication indicates that the user accepts the offer, terms of service, etc. (e.g., "yes" at operation 612), the service module 126 can provide the 5G services to the user device 102 via the API 128, as illustrated at operation 420. That is, in at least one example, the service module 126 can enable the user device 102 to access the 5G services for a duration of time, which can be provided at a guaranteed bit rate for the duration of time. As described above, in some examples, the guaranteed bit rate can be determined at the time of the request based at least in part on information associated with the 5G network 114 at that time. In examples where such access is associated with a cost, the service module 126 can charge an account of the user or otherwise obtain payment for such access from the user.

As described above, in at least one example, to provide the 5G services to the user device 102, the service module 126, via the network module 130, can expose a radio network resource scheduler for API control by the API 128, expose cell configuration parameters for API control by the API 128, expose E2E bandwidth allocation (e.g., gateway resources, backbone network resources, backhaul bandwidth resources and RAN resources, etc.), expose guaranteed edge server capacity at the edge computing platform for API control by the API 128, and/or the like. That is, the service module 126, via the network module 130, can expose the control of the network parameters for the API 128.

At operation 616, the service module 126 can refrain from providing the 5G services to the user device 102. In at least one example, if the user device 102 does not return an indication associated with the notification and/or the indication of input indicates that the user does not desire access to the 5G services (e.g., does not confirm the request) (e.g., "no" at operation 612), the service module 126 can refrain from providing the 5G services to the user device 102.

At operation 618, if the 5G services are not available (e.g., "no" at operation 606), the service module 126 can deny the request. In such an example, the service module 126 can send an indication of the denial to the user device 102. The user device 102 can cause such an indication to be output via a user interface of the user device 102.

While FIGS. 4-6 are described with reference to accessing 5G services via the API 128, in additional or alternative examples, any type of network technology can be accessed via the API 128, as described herein.

Although the subject matter has been described in language specific to structural data items and/or methodological acts, it is to be understood that the subject matter defined in the appended claims is not necessarily limited to the specific data items or acts described. Rather, the specific data items and acts are disclosed as example forms of implementing the claims.

What is claimed is:

1. A computer-implemented method comprising:
receiving a request for wireless communication services from an application executable by a user device;
sending the request to one or more computing devices associated with the wireless communication services;
receiving, from the one or more computing devices, an indication that the request has been granted;
presenting a notification associated with the wireless communication services that are available; and
based at least in part on receiving an indication of an input associated with the notification, providing the wireless communication services to the application.

2. The computer-implemented method as claim 1 recites, further comprising:
presenting, via a user interface, one or more service options associated with the wireless communication services; and receiving the request based at least in part on an input indicating a selection of a service option of the one or more service options.

3. The computer-implemented method as claim 2 recites, wherein the service option is associated with one or more parameters associated with the wireless communication services for optimizing performance of the application.

4. The computer-implemented method as claim 3 recites, wherein the one or more parameters comprise at least one of a latency parameter, a throughput parameter, or a quality of service parameter.

5. The computer-implemented method as claim 1 recites, wherein the notification is associated with a cost and a duration for which the wireless communication services are to be provided.

6. The computer-implemented method as claim 5 recites, wherein providing the wireless communication services to the application comprises providing the wireless communication services at a guaranteed bit rate for the duration.

7. The computer-implemented method as claim 1 recites, wherein the application comprises at least one of a cross reality application, a gaming application, an Internet of Things application, an entertainment application, an advertising application, or a precision control application.

8. A system associated with a wireless communication service provider, the system comprising:
one or more processors; and
one or more computer-readable media storing instructions that, when executed by the one or more processors, cause the system to perform operations comprising:
receiving, by a user device, a request for wireless communication services;
determining, based at least in part on information associated with a network associated with the wireless communication service provider, that the wireless communication service provider can accommodate the request;
causing a notification to be presented, wherein the notification indicates that the wireless communication services are available; and
based at least in part on receiving an indication of an input associated with the notification, providing the wireless communication services to the user device.

9. The system as claim 8 recites, the operations further comprising:
causing one or more service options associated with the wireless communication services to be presented via a user interface associated with the user device; and
receiving the request based at least in part on an input indicating a selection of a service option of the one or more service options.

10. The system as claim 9 recites, wherein the service option is associated with one or more parameters associated with the wireless communication services for optimizing performance of an application operating on the user device.

11. The system as claim 10 recites, wherein the one or more parameters comprise at least one of a latency parameter, a throughput parameter, or a quality of service parameter.

12. The system as claim 8 recites, the operations further comprising determining at least one of a cost or a duration of time associated with providing the wireless communication services, wherein the notification further includes an indication of at least one of the cost or the duration.

13. The system as claim 8 recites, wherein providing the wireless communication services comprises providing the wireless communication services at a guaranteed bit rate for a duration of time.

14. The system as claim 8 recites, wherein the request is associated with a physical cell ID (PCI) indicating a cell of the network within which the user device is operating.

15. The system as claim 14 recites, wherein the information associated with the network comprises an occupancy of the cell of the network within which the user device is operating.

16. One or more non-transitory computer-readable media storing instructions that, when executed by one or more processors, cause the one or more processors to perform operations comprising:
receiving, from an application executable by a user device, a request for wireless communication services availed via a wireless communication service provider;
determining, based at least in part on information associated with a network associated with the wireless communication service provider, that the wireless communication service provider can accommodate the request;
causing a notification to be presented, wherein the notification indicates that the wireless communication services are available; and
based at least in part on receiving an indication of an input associated with the notification, providing the wireless communication services to the application.

17. The one or more non-transitory computer-readable media as claim 16 recites, wherein the request is associated with one or more parameters associated with the wireless communication services for optimizing performance of at least one of the application or another application associated with the application.

18. The one or more non-transitory computer-readable media as claim 17 recites, wherein the one or more parameters comprise at least one of a latency parameter, a throughput parameter, or a quality of service parameter.

19. The one or more non-transitory computer-readable media as claim 16 recites, the operations further comprising determining at least one of a cost or a duration of time associated with providing the wireless communication services, wherein the notification further includes an indication of at least one of the cost or the duration.

20. The one or more non-transitory computer-readable media as claim 19 recites, wherein providing the wireless communication services to the application comprises providing 5G wireless communication services at a guaranteed bit rate for a duration of time.

* * * * *